Patented Aug. 19, 1952

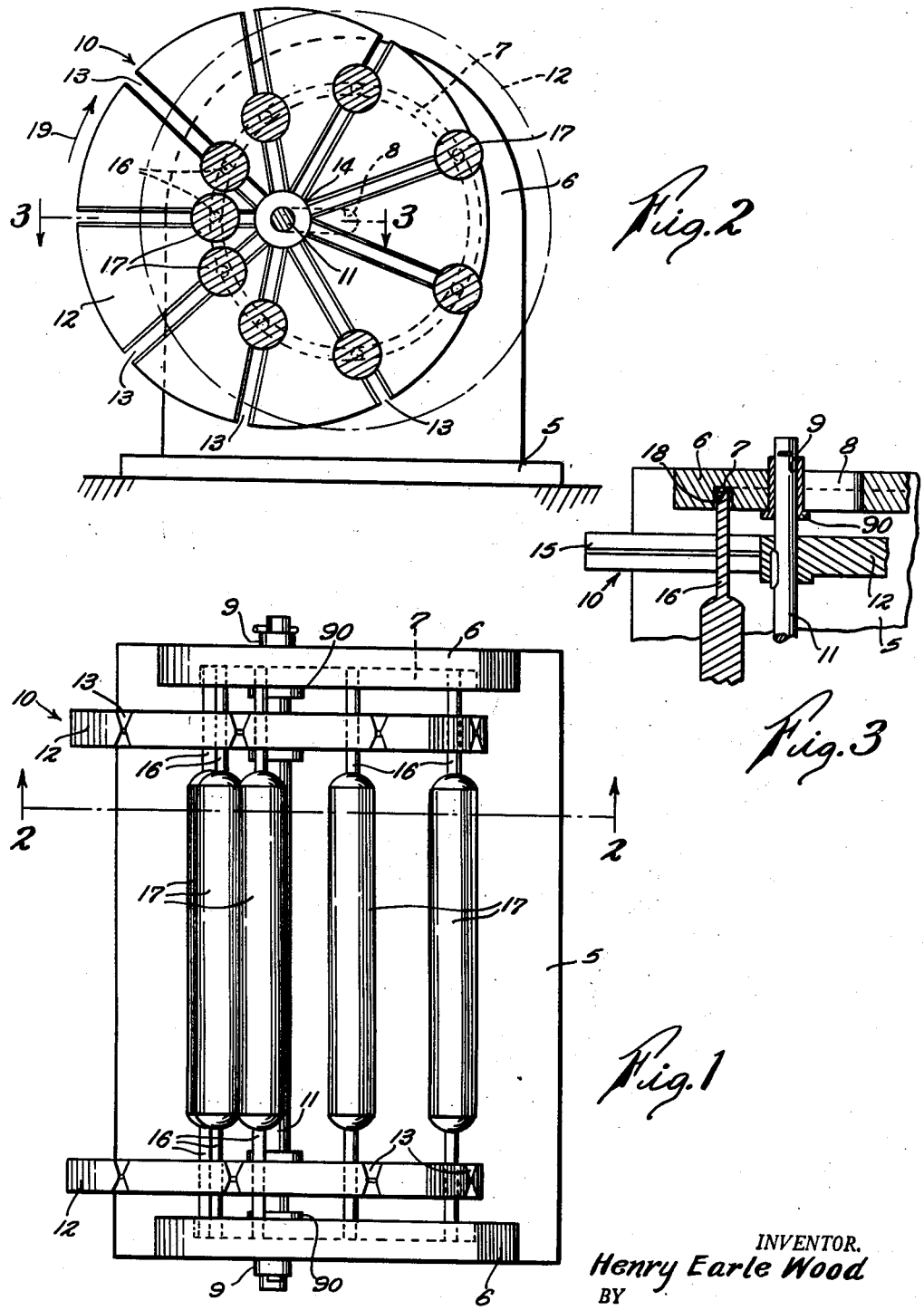

2,607,158

UNITED STATES PATENT OFFICE 2,607,158

ROTARY DISK TOY

Henry Earle Wood, Cincinnati, Ohio

Application June 21, 1951, Serial No. 232,775

6 Claims. (Cl. 46—49)

The present invention relates to devices in the nature of amusement and educational apparatus and has for an object the provision of a device of this character that is relatively simple in construction which employs moving parts arranged and adapted to attract attention, and to provoke thoughtful observation and an interest in mechanical apparatus.

Another object of the invention is to provide a device of this kind employing a plurality of similar elements which are adapted to travel through an endless path and in order, and a means that is adjustable for varying the speed and the spacing of the elements during the cycle of travel.

Still another object of the invention is to provide a device of this kind which may be termed a gravitator toy wherein the traveling elements, which may be distinctively colored and decorated, may produce interesting optical color effects during operation of the device.

A further object of the invention is to provide a device of this kind with simple antifriction bearings in order to prolong the effect of a rotary impulse manually imparted thereto.

These and other objects are attained by the means described herein and illustrated in the accompanying drawings, in which:

Fig. 1 is a top plan view of a device of the invention.

Fig. 2 is a cross sectional view taken on line 2—2 of Fig. 1.

Fig. 3 is a fragmental cross sectional view taken on line 3—3 of Fig. 2.

In the illustrated embodiment of the invention a base 5 has a pair of parallel upright stator members 6—6 secured, one at each end of the base, and in opposition to each other. The inner faces of elements 6 have circular tracking grooves 7 formed therein, the tracks 7 having aligned centers. Each of the elements 6 is further provided with a horizontal slot 8 therethrough, the longitudinal center line of the slot passing through the center axis of the circular groove 7 and extending only slightly beyond said center in one direction while in the other direction the end of the slot is disposed at an appreciably greater distance from said center. Each slot 8 has mounted therein a slidably adjustable bearing 9 of any suitable antifriction type. The bearings 9 are shown in adjusted position at the ends of slots 8 for disposing the bearings eccentrically of the tracks 7. It is to be understood that said bearings may be adjusted to the opposite end of the slot, in which case said bearings will be concentric with the circular tracks 7. Flanges 90 on bearings 9 guide on the faces of stator 6 and facilitate adjustment of shaft 11 in parallelism with an axis passing through the centers of tracks 7. A rotor assembly indicated generally by reference numeral 10 comprises a shaft 11 journalled at opposite ends in bearings 9 and having radially slotted rotor discs 12 fixed thereto at a distance from the ends so that said discs rotate as a unit with the shaft as the latter turns in its bearings and the discs will turn in planes parallel to the respective stator elements 6. In the present simple embodiment of the invention the external cross section of the bearing members 9 is square and of dimensions to provide a snug sliding fit in slots 8 to permit of adjustment as desired from a concentric relation with tracks 7, to various degrees of eccentricity therewith. Discs 12 are of course concentric with shaft 11. The slots 13 in the respective discs 12 extend from the peripheries radially toward the central solid hub portion 14 (see Fig. 2) and said slots are spaced apart at equal angles. Said slots 13 may be of an uneven number. As shown in Fig. 3 the opposed faces of the slots 13 may be beveled to the center to provide a thin elevated line 15 for affording a minimum frictional contact with the guide pins 16 which pass from the ends of weight bars 17 through radial slots 13 in the discs and into the track grooves 7 on the sides of which they are guided by antifriction roller discs 18.

In the present embodiment the device is set into motion by imparting a manual spinning impulse to one or both discs 12 in the direction of the dashed arrow 19. With the bearings 9 arranged eccentrically of tracks 7 as illustrated the weight bars are spaced in parallelism but unequal distances apart by the cooperation of tracks 7 in the stator elements 6 and the radial slots 13 in the discs 12. As the rotor assembly turns in its bearings the bars 17 follow the circular path defined by tracks 7 but they change their spacing with respect to adjacent bars progressively during the cycle of rotation. The rate of bodily travel of the individual bar 17 thus increases as it moves from the extreme left-hand side (Fig. 2) to the extreme right-hand side as the discs drive them through the upper half of their course and the movement decreases in speed during the second or lower half of their course back to the starting point.

The longer leverage exerted by bars 17 near the outer ends of slots 13 serves to sustain the continued rotation of the rotor for a sufficient interval of time to enable the user to observe the novel effect of the individual bars apparently departing from a closely crowded condition at one side to an appreciably spaced relation at the other side of the gravitator although all bars are constantly moving so long as the discs continue to turn.

It will be readily apparent from Fig. 2 that as the degree of eccentricity between tracks 7 and the center of rotation in bearings 9 determines the varying radial spacing of bars 17 from the axis of the rotor shaft 11 at different positions about the circular track, the bodily speeds of movement of the bars will increase and decrease during each cycle of movement, said speeds varying as much as five or six fold. Some very interesting optical illusions of color blending and resolution may be attained when adjacent bars are differently colored and the main speed of rotation of the discs gradually decreases sometime after the initial impulse is imparted thereto. When the bearings 9 are adjusted concentrically with the center of tracks 7 the discs 12 assume the dot dash line position shown in Fig. 2 and the bars 17 are all equally spaced apart and on turning of the rotor said bars all move at equal rate of speed.

The device as shown is simple to adjust and to operate and tends to provoke scientific and inquiring thought in the mind of the user.

It is to be understood that refinements and improvements may be made in the structure and the specific mode of setting it into operation, all within the spirit of the invention and the scope of the appended claims.

What is claimed is:

1. In a device of the class described the combination of a stator assembly comprising spaced upright parallel members having opposed concentric circular tracks thereon, said members having horizontal slots disposed within the circular area bounded by the tracks, a bearing member mounted for adjustment longitudinally of each slot, a rotor assembly comprising a shaft journalled at its opposite ends in said bearings and a pair of radially slotted discs fixed respectively thereon adjacent the stator tracks, and a plurality of weight bars having bearing pins at opposite ends guided in the opposed circular tracks and in the slots in said discs.

2. In a device of the class described the combination of means providing axially spaced uniform and concentric circular tracks, guide slots in said means disposed in a common plane on diameters of the respective tracks, bearing members adjustable longitudinally in said slots, a shaft journalled in said bearings and traversing the space between the planes of said tracks, discs fixed to the shaft adjacent each track, said discs having radially extending slots therethrough and weight bars including guide pins at opposite ends extending through the slots in the respective discs and guidedly travelable along the circular tracks.

3. A gravitator device comprising spaced apart concentric uniform circular tracks, a plurality of weight bars having the opposite ends guided by the tracks, a pair of bearing members adjustable in a common plane on diameters of the circular tracks and a rotor member including a shaft journalled at the ends in said bearings and a pair of discs fixed on said shaft and disposed parallel and adjacent the respective tracks, said discs having uniformly spaced radial slots adapted in all adjusted positions of the bearings to extend substantially beyond the circumference of the tracks, the weight bars guided at opposite ends in corresponding radial slots in said pair of discs.

4. In a toy of the class described a stator providing opposed concentric circular tracks disposed in parallel vertical planes at the ends of the said stator, a rotor comprising an axle and a pair of uniformly and radially slotted discs secured thereon, bearing means supporting the axle at opposite ends in selected concentric and eccentric positions along horizontal diameters of said tracks, and a plurality of bar members each received in corresponding radial slots in said discs and guidingly supported at opposite ends by said tracks, turning of the rotor on its axle in its bearings serving to travel the bars in parallel relation along said tracks and eccentric adjustment of said rotor axle serving to vary the spacing of the bars in the course of travel around the tracks.

5. The device as set forth in claim 4 and wherein the adjacent bars are differently colored for producing the visual effect of color blending and color variation.

6. In combination a unitary rotor member including a pair of parallel discs having radial slots extending from the peripheries toward their centers, bars each having end portions thereof disposed in corresponding slots in said pair of discs, antifriction bearing members on the ends of the bars, a stator having spaced parallel tracks receiving the said antifriction bearing members for guided travel of the bars around the tracks, an axle having the said discs fixed thereon and bearings for the opposite ends of the axle adjustable horizontally on the stator between diametrically opposite sides of the tracks.

HENRY EARLE WOOD.

REFERENCES CITED

The following references are of record in the file of this patent:

FOREIGN PATENTS

| Number | Country | Date |
|---|---|---|
| 510,206 | France | Sept. 1, 1920 |